Aug. 30, 1966 S. J. SCHWARTZ ET AL 3,270,326

THIN FILM MAGNETIC STORAGE DEVICE

Filed Nov. 1, 1960

2 Sheets-Sheet 1

INVENTORS
SIDNEY J. SCHWARTZ
WILLIAM F. CHENOWETH

BY Louis A Kline
J Haunder
HIS ATTORNEYS

INVENTORS
SIDNEY J. SCHWARTZ
WILLIAM F. CHENOWETH

BY Louis A. Kline
J. Havender
HIS ATTORNEYS

United States Patent Office 3,270,326

Patented August 30, 1966

3,270,326

THIN FILM MAGNETIC STORAGE DEVICE

Sidney J. Schwartz and William F. Chenoweth, Dayton, Ohio, assignors to The National Cash Register Company, Dayton, Ohio, a corporation of Maryland Filed Nov. 1, 1960, Ser. No. 66,610
15 Claims. (Cl. 340—174)

Figure 1:
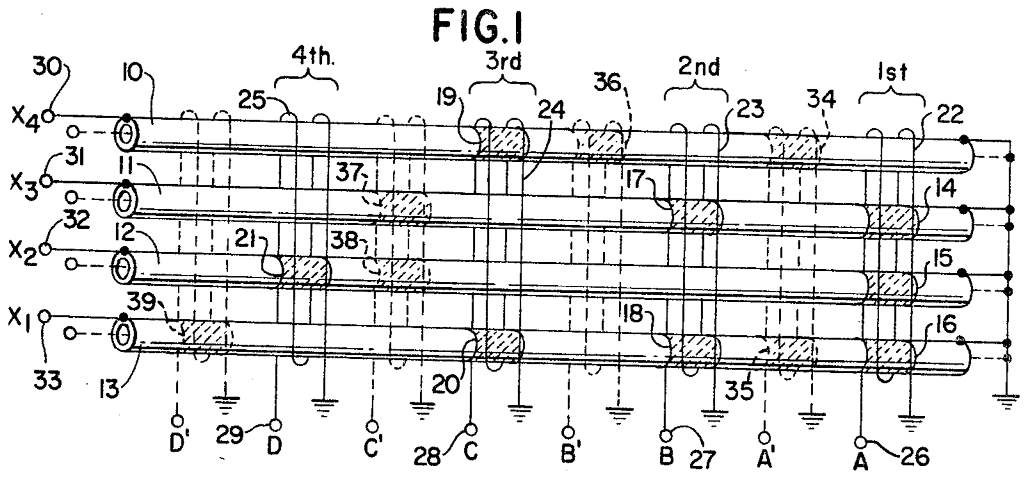

The present invention relates generally to logical devices and more particularly relates to a novel type of logical device which is of simple construction and yet is characterized by extreme flexibility in being readily adaptable to be utilized in a variety of computer and data processor building blocks.

In copending United States patent applications Serial No. 791,695, of Ignatius Tsu, filed February 6, 1959, now abandoned, and Serial No. 696,987, of John R. Anderson et al., filed November 18, 1957, now U.S. Patent No. 3,042,997, both of which applications are assigned to the present assignee, and also in United States Patent No. 2,945,217, of Robert D. Fisher et al., issued July 12, 1960, there are shown and described various methods of fabricating a novel type of magnetic data storage device. Such a device comprises an electrically conductive wire having a ferromagnetic coating electrodeposited thereon in a manner whereby a preferred direction of magnetization is established therein which is oriented at a predetermined angle with respect to the longitudinal axis of the device. Due to the fact that such a storage device has been found to possess a substantially high positive and negative magnetic remanence and a substantially rectangular hysteresis characteristic along the preferred direction of magnetization, selected length portions of the coating are individually capable of being magnetically saturated in either of two opposite directions along the path of preferred direction of magnetization thereof. Consequently, a magnetizing force of ±H oersteds oriented along the path of preferred direction of magnetization thereof is capable of causing selected ones of the length portions to be switched from one saturation state to the other, whereas a magnetizing force of $\pm H/2$ oersteds produces only negligible changes in the saturation state thereof.

During operation of the device, a plurality of coils are separately wound thereabout and are positioned in a spaced side-by-side relationship with respect to one another to encompass and thereby define a corresponding plurality of length portions, each of which possesses a preferred direction of magnetization which is oriented at a predetermined angle with respect to the longitudinal axis of the device. Storage of binary information in a selected length portion is accomplished simply by sending a current impulse of half-select magnitude through the electrically conductive wire, which constitutes the common core thereof, and, simultaneously therewith, sending a current impulse of half-select magnitude through the selected coil, in such directions that the vector summation of the two magnetizing forces produced by a coincidence of the two half-select currents is at least equal in magnitude to ±H oersteds and is oriented in substantially the same direction as the preferred direction of magnetization of the coating.

During interrogation of a selected length portion, either the core or the corresponding coil is pulsed with a current impulse of full-select magnitude to individually develop a magnetizing force of ±H oersteds in the opposite direction from the magnetizing force developed during storage of the function. In response to the "read" impulse, an electrical signal is or is not available across the ends of the core or the corresponding coil, depending upon which one is pulsed, according to whether the binary digit "one" or "zero" had previously been established in that particular length portion encompassed by that particular coil as represented by a positive or negative state of saturation thereof.

It is a primary object of the present invention to devise a new and improved logical device which uniquely utilizes the various characteristics of the type of storage device disclosed in the before-mentioned applications and patent.

Another object of the present invention is to devise a novel logical device which has the characteristics of extreme flexibility in being utilized in substantially an unlimited number of computer and data processor building blocks.

Still another object of the present invention is to devise a novel logical device which is characterized by extreme simplicity of construction and operation.

In accordance with the present invention, such a novel logical device comprises a plurality of elongated substrates each of which is effectively divided into a plurality of longitudinally ordered locations. A plurality of discrete areas of magnetizable material, each having a preferred direction of magnetization, surround individual ones of the substrates at predetermined locations according to a desired code, and means are provided for selectively applying a magnetizing force to each of the magnetizable areas at an angle with respect to the preferred direction of magnetization thereof, and for detecting a magnetic flux change within the magnetizable areas as a result of the application of a magnetizing force thereto.

Figure 2:
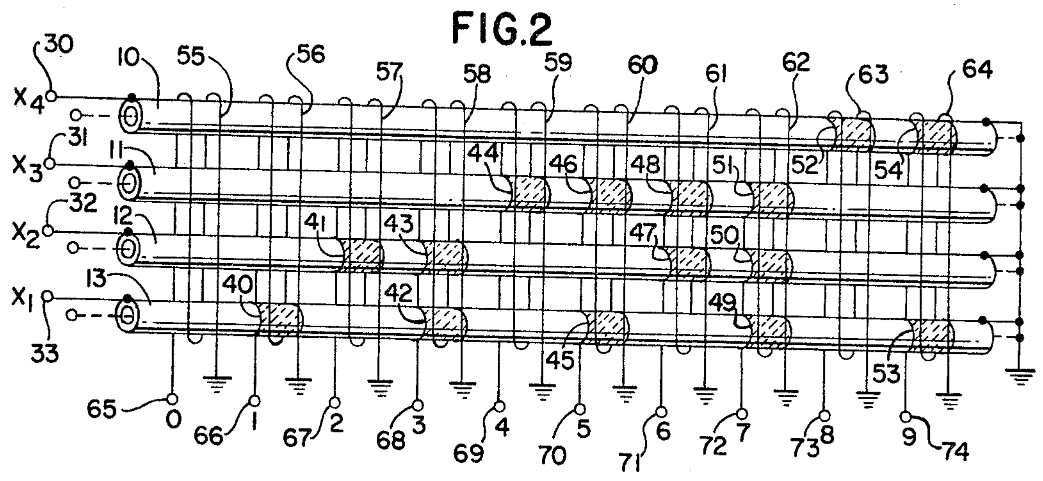
Figure 3:
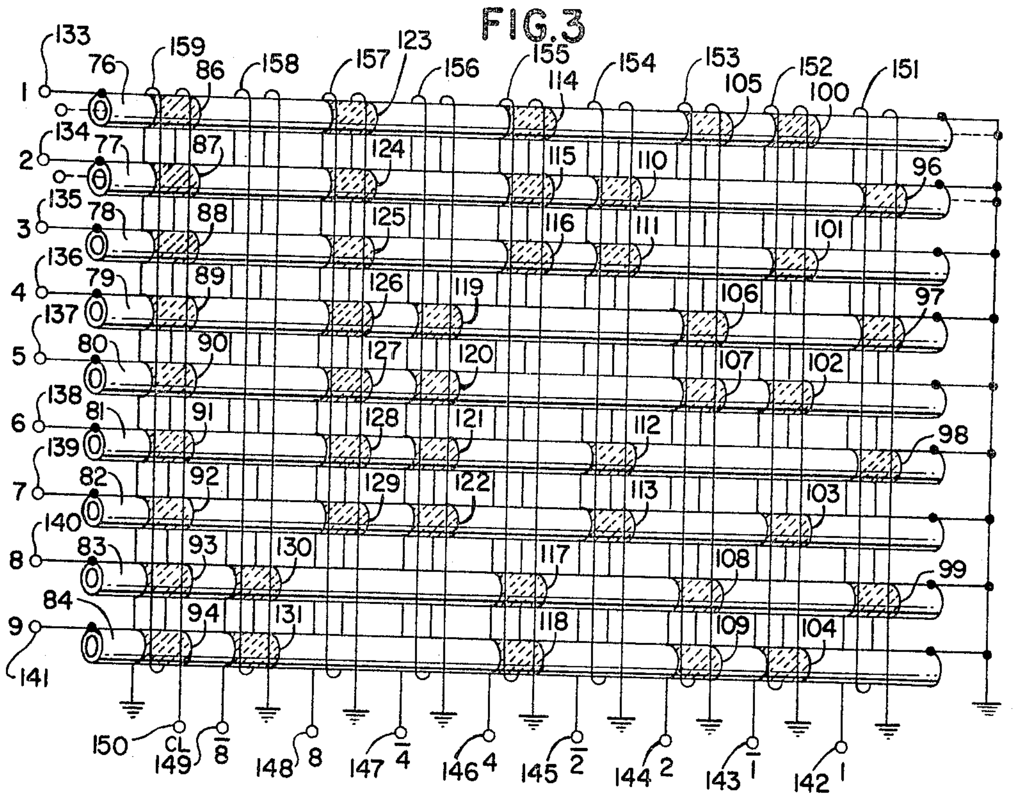
Figure 4:
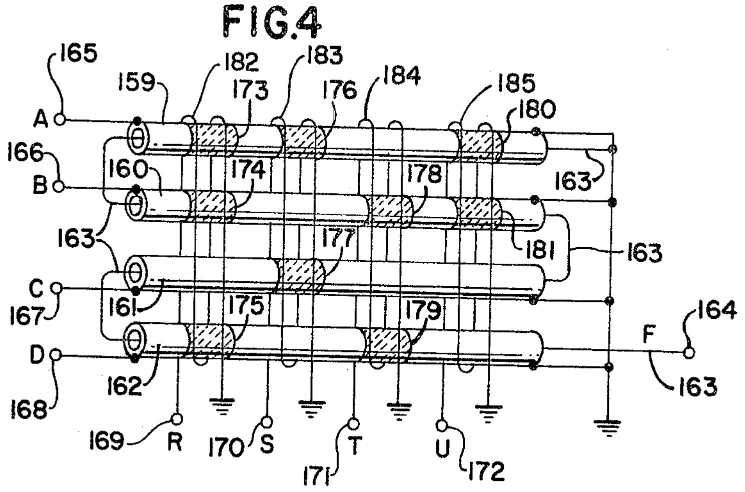

The features of the present invention which are believed to be novel are set forth with particularity in the appended claims. The organization and mode of operation of the invention, together with further objects and advantages thereof, may best be understood by reference to the following description taken in connection with the accompanying drawings, in the several figures of which like reference numerals identify like elements, and in which:

FIG. 1 schematically illustrates an embodiment of the present invention in the form of a memory type of logical device in which predetermined information is permanently stored therein;

FIG. 2 schematically illustrates another embodiment, in the form of a decimal-to-binary converter type of logical device;

FIG. 3 illustrates still another embodiment in the form of a binary-to-decimal converter type of logical device; and FIG. 4 schematically illustrates still another embodiment of a logical device constructed in accordance with the teachings of the present invention.

As is well known to those familiar with the computer art, the representation of numerical information is commonly predicated upon the use of a scheme of positional notations wherein digits are arranged in a sequence with the understanding that successive digits of the sequence are to be interpreted as coefficients of successive powers of an integer called the "base"; in a binary system of notation the base is "2," and in a decimal system the base is "10." Only two digits, commonly called "bits," are employed in a binary system of notation; i.e., "0" and "1," with binary digit 0 representing the decimal digit 0 and the binary digit 1 representing the decimal digit 1. Thus, the digital positions, or orders, in a binary number, reading from right to left, correspond in value to $2^0$, $2^1$, $2^2$, $2^3$, $2^4$, etc., respectively representing decimal digits 1, 2, 4, 8, 16, etc. For example, the number 1001 may be considered as the binary representation of the decimal digit 9, which is determined by the arithmetic addition of decimal digits 1 and 8 as indicated by the binary digit 1 being located in the extreme right and left binary positions, respectively. Hence, by utilizing electrical impulses in groups of four, wherein the presence of an impulse represents the binary digit 1 and the absence of an impulse represents the binary digit 0, each of the decimal digits 0 through 9 may be represented in a pure binary notation by means of a timed sequence of impulses. A system in which each of the decimal digits is individually represented in a pure binary notation is commonly referred to as a "binary-coded-demical" system. Since four consecutive binary orders, reading from right to left, represent the decimals digits 1, 2, 4, and 8 for the units decimal order, it follows that four consecutive binary orders of the tens decimal order are effectively representative of the decimal digits 10, 20, 40, and 80, respectively. Likewise, in subsequent higher decimal orders, for example, the four consecutive binary orders of the hundreds decimal order are effectively representative of the decimal digits 100, 200, 400, and 800, respectively. As an example, the decimal number 459 is represented in the binary-coded-decimal system by 0100, 0101, 1001, whereby the four binary bits of the rightmost group represent the decimal digit 9 of the units order, the center group of four bits represent the decimal digit 5 of the tens order, and the four bits of the leftmost group represent the decimal digit 4 of the hundreds order.

With the foregoing in mind, reference is now made to FIG. 1, wherein there is schematically illustrated, in greatly simplified form, one embodiment of a logical device incorporating the various novel aspects of the present invention.

Accordingly, a plurality of tubular and electrically conductive substrates 10 through 13 are each effectively divided into four longitudinally ordered locations which are indicated generally as 1st, 2nd, 3rd, and 4th. As will become more apparent hereinafter, the particular number of substrates and the particular number of ordered locations into which each substrate is divided are not critical and are dictated solely by the intended application and use of the particular logical device. It is, therefore, to be appreciated that the particular number of substrates and/or ordered locations herein chosen are merely for illustrative purposes only. The substrates 10 through 13 are grouped together in such a manner as to provide a coordinately arranged row-and-column matrix of locations. In the present example, there are four rows of locations along the "X" or horizontal coordinate direction and four columns of locations along the "Y" or vertical coordinate direction, thus effectively constituting a four-by-four matrix of sixteen locations.

A plurality of discrete areas of magnetizable material in the form of rings or bands 14 through 21 surround individual ones of the substrates 10 through 13 at predetermined ones of the locations in accordance with a predetermined pattern or code, the criteria governing the determination of which code will be more fully appreciated hereinafter. In the illustrative example of FIG. 1, the magnetizable areas 14 through 16 individually surround a different one of the substrates 11 through 13 at the 1st order locations thereof; the areas 17 and 18 individually surround a different one of the substrates 11 and 13, respectively, at the 2nd order locations thereof; the areas 19 and 20 individually surround a different one of the substrates 10 and 13, respectively, at the 3rd order locations thereof; and the area 21 surrounds the substrate 12 at the 4th order location thereof. In the manner fully set forth in either of the before-mentioned copending applications and patent, each of the magnetizable areas is provided with a preferred direction of magnetization which is oriented at an angle with respect to the longitudinal axis of the respective substrate encompassed thereby, as diagrammatically indicated by the diagonal dotted lines. A plurality of electrically energizable coils 22 through 25, one for each column of positions, individually encompass each of the substrates 10 through 13 at corresponding ordered positions thereof. Thus, coil 22 is inductively coupled to each of the magnetizable areas 14 through 16, which are located in the 1st order columnar positions; coil 23 is inductively coupled to each of the areas 17 and 18, which are located in the 2nd order columnar positions; coil 24 is inductively coupled to each of the areas 19 and 20, which are located in the 3rd order columnar positions; and coil 25 is inductively coupled to magnetizable area 21, which is located in the 4th order columnar position.

One end of each of the coils 22 through 25 is returned to ground potential, whereas their remaining ends are each respectively connected to a different one of terminals 26 through 29. One end of each of the substrates 10 through 13 is also connected to ground potential, whereas their remaining ends are respectively connected to a different one of terminals 30 through 33.

As previously mentioned, each of the magnetizable areas 14 through 21 is provided with a preferred direction of magnetization which is oriented at an angle with respect to the longitudinal axis of the respective substrate encompassed thereby. Consequently, a magnetic flux reversal therein, due to either an axial or a circular magnetizing force applied thereto, follows an angular path with respect to the longitudinal axis of the respective substrate. This is, of course, assuming that the magnetizing force applied thereto is of insufficient magnitude to cause the magnetic flux to be aligned therewith by "brute force." Therefore, each of the magnetizable areas causes a voltage impulse to be induced in the respective substrate, or the respective coil coupled thereto, each time the direction of magnetization thereof is reversed as a result of a saturating force being applied thereto in either of the two coordinate directions, thus permitting at least two modes of operation of the device.

In other words, when a "full-select" current impulse is applied to the respective input terminal of either of the coils 22 through 25, having sufficient magnitude and polarity to effect a reversal of the direction of remanent saturation of each of the magnetizable areas coupled thereto, a voltage impulse is induced in the particular substrates encompassed by the magnetizable areas, whose remanent saturation is thus reversed. Likewise, when a full-select current impulse is applied to the respective input terminal of either of the substrates 10 through 13, a voltage impulse is induced in each of the coils 22 through 25 which is coupled to a magnetizable area whose remanent saturation is reversed.

In summary, a full-select current impulse applied to terminal 30 causes a potential impulse to be induced in coil 24; a full-select current impulse applied to terminal 31 causes a potential impulse to be induced in each of coils 22 and 23; a full-select current impulse applied to terminal 32 causes a potential impulse to be induced in each of coils 22 and 25; a full-select current impulse applied to terminal 33 causes a potential impulse to be induced in each of coils 22, 23, and 24; a full-select current impulse applied to terminal 26 causes a potential impulse to be induced in each of substrates 11, 12, and 13; a full-select current impulse applied to terminal 27 causes a potential impulse to be induced in each of substrates 11 and 13; a full-select current impulse applied to terminal 28 causes a potential impulse to be induced in each of substrates 10 and 13; and a full-select current impulse applied to terminal 29 causes a potential impulse to be induced in substrate 12.

From the foregoing, it is now obvious that if the terminals 30 through 33 are considered as input terminals and the terminals 26 through 29 are considered as output terminals, and if the full-select current impulses applied applied to the terminals 30 through 33 are respectively designated $X_4$ through $X_1$ and the output potential impulses at the terminals 26 through 29 are respectively designated A through D, the decimal values of the words represented by the coded placement of the magnetizable areas on the substrates 10 through 13 are expressed by the following logical equations:

$X_1=\overline{D}\cdot C\cdot B\cdot A$ (representative of the decimal digit 7)

$X_2=D\cdot\overline{C}\cdot\overline{B}\cdot A$ (representative of the decimal digit 9)

$X_3=\overline{D}\cdot\overline{C}\cdot B\cdot A$ (representative of the decimal digit 3)

$X_4=\overline{D}\cdot C\cdot\overline{B}\cdot\overline{A}$ (representative of the decimal digit 4)

where the period between each two symbols is a logical AND notation and where the dash above a symbol indicates not TRUE, or No Pulse Present.

Conversely, if terminals 26 through 29 are considered as the input terminals to the logical device rather than terminals 30 through 33, the decimal values of the words represented by the coded placement of the magnetizable areas on the substrates 10 through 13 are expressed by logical equations:

$A=\overline{X}_4 \cdot X_3 \cdot X_2 \cdot X_1$ (representative of the decimal digit 7)
$B=\overline{X}_4 \cdot X_3 \cdot \overline{X}_2 \cdot X_1$ (representative of the decimal digit 5)
$C=X_4 \cdot \overline{X}_3 \cdot \overline{X}_2 \cdot X_1$ (representative of the decimal digit 9)
$D=\overline{X}_4 \cdot X_3 \cdot \overline{X}_2 \cdot \overline{X}_1$ (representative of the decimal digit 2)

It is therefore evident that, in accordance with the present invention, there has been devised a novel memory type of logical device wherein information is permanently stored and which is capable of being continually read out in either a serial or a parallel mode at extremely high speeds measured in megacycles or less. Such a device finds great utility in a computing system wherein it is desired for various computing constants to be permanently stored therein in readily addressable form. If it is assumed that each of the magnetizable areas is composed of a suitable magnetic material having a substantially rectangular hysteresis loop characteristic, the remanent saturation of each of the areas must be reset in a conventional manner prior to the initiation of each logic operation. However, it is preferred that each of the magnetizable areas possess a transformer type hysteresis loop, whereby the operation depends only upon reversible flux and, consequently, no reset operation is necessary.

In order to expand the word capacity of such a memory without the obvious need for additional substrates, it is necessary only to provide an additional set, or sets, of magnetizable areas, each of which set being disposed around the substrates at predetermined locations according to a different desired code, and to provide an additional set of energizable coils for each additional set of magnetizable areas, with each coil being inductively coupled to all the magnetizable areas located at like-ordered columnar positions. It is preferred, however, that an additional set, or sets, of magnetizable areas be provided and that the read-out coils be manually shifted into inductively coupled relationship with respect to each selected set of magnetizable areas. The foregoing principle is also illustrated in FIG. 1, wherein the reference numerals 34 through 39 refer to a second set of magnetizable areas, which are additionally arranged on the substrates 10 through 13 in accordance with a different desired code, indicative of another desired word. Each of the coils illustrated by the dotted lines immediately to the left of each of the coils 22 through 25 respectively represents that particular coil in its shifted position.

When the coils 22 through 25 are shifted to the left, as indicated, or, conversely, when the substrates 10 through 13 are shifted to the right, the following equations logically express each of the input functions in terms of the output functions:

$X_1=D' \overline{C}' \overline{B}' A'$ (representative of the decimal digit 9)
$X_2=\overline{D}' C' \overline{B}' \overline{A}'$ (representative of the decimal digit 4)
$X_3=\overline{D}' C' \overline{B}' \overline{A}'$ (representative of the decimal digit 4)
$X_4=\overline{D}' \overline{C}' B' A'$ (representative of the decimal digit 3)
$A'=X_4 \overline{X}_3 \overline{X}_2 X_1$ (representative of the decimal digit 9)
$B'=X_4 \overline{X}_3 \overline{X}_2 \overline{X}_1$ (representative of the decimal digit 8)
$C'=\overline{X}_4 X_3 X_2 \overline{X}_1$ (representative of the decimal digit 6)
$D'=\overline{X}_4 \overline{X}_3 \overline{X}_2 X_1$ (representative of the decimal digit 1)

With reference to FIG. 2, there is schematically illustrated therein another embodiment of a logical device constructed in accordance with the present invention. In this particular embodiment, the substrates 10 through 13 are effectively divided into ten longitudinally ordered positions and magnetizable areas 40 through 54 surround individual ones of the substrates at predetermined locations in accordance with a decimal-to-binary conversion code, whereby decimal digits are individually converted into a four-bit binary positional sequence. As before, a plurality of coils 55 through 64, one for each column of positions, are each inductively coupled to all of the magnetizable areas of a different column. Thus, the binary functions appearing at the output terminals 30 through 33 are expressed in terms of the decimal functions applied to the input terminals 65 through 74 by the following logical equations:

$$X_1=1+3+5+7+9$$
$$X_2=2+3+6+7$$
$$X_3=4+5+6+7$$
$$X_4=8+9$$

where the plus signs represent a logical OR of the various input functions.

Therefore, logically speaking, output function $X_1$ is rendered TRUE each time either one of input functions 1, 3, 5, 7, or 9 is rendered TRUE; output function $X_2$ is rendered TRUE each time either one of output functions 2, 3, 6, or 7 is rendered TRUE; output function $X_3$ is rendered TRUE each time any one of input functions 4 through 7 is rendered TRUE; and output function $X_4$ is rendered TRUE each time either one of input functions 8 or 9 is rendered TRUE. Thus, it is evident that the logical states of output functions $X_1$ through $X_4$ collectively represent the binary equivalent of individual ones of decimal input functions 1 through 9. For example, when a full-select current impulse is applied to the input terminal 72, representative of the decimal digit 7, a potential impulse appears at each of the output terminals 31, 32, and 33, thereby representing 0111, the binary equivalent of the decimal digit 7.

In FIG. 3 is illustrated still another embodiment of a logical device incorporating the novel features of the present invention. In this particular embodiment, nine substrates 76 through 84 are utilized with each being effectively divided into nine longitudinally ordered positions. In the leftmost column of positions, a plurality of magnetizable areas 86 through 94 are so arranged that each area encompasses a different one of the substrates 76 through 84 and is inductively coupled in the same sense to a common clock coil 159. The remainder of the magnetizable areas (96 through 131) surround individual ones of the substrates 76 through 84 in accordance with a binary-to-decimal conversion code, whereby an input of binary information at the terminals 142 through 149 results in an output of the equivalent decimal information at the terminals 133 through 141 in a manner which will be more readily apparent from the following description of the mode of operation of the device. However, it is first to be noted that each of the coils 151 through 158 is inductively coupled in the same sense to all the magnetizable areas of a different column, which sense is opposite with respect to the sense in which the clock coil 159 is coupled to the areas 86 through 94.

The mode of operation of the logical device shown in FIG. 3 is as follows: The clock coil 159 is energized at each logic time, so that the direction of magnetization of each of the areas 86 through 94 is caused to be reversed thereby. As a result, a potential impulse is induced in each of the substrates 76 through 84 of the same polarity. If any one of the coils 151 through 158 is simultaneously energized therewith, a potential impulse of equal and opposite polarity is induced in each of the substrates encompassed by a magnetizable area, whose direction of magnetization is thereby caused to be reversed. Conquently, a potential impulse appears at each of the output terminals 133 through 141 as a result of the energization of the clock coil 159, unless the impulse is cancelled out by one or more of the potential impulses which are generated as a result of selected ones of the coils 151 through 158 being energized simultaneously therewith.

As an example, let it be assumed that binary information 0101, representative of the decimal digit 5, is applied at the logic time to selected ones of the input terminals 142 through 149. As a result of the input of binary information 0101 to selected ones of the terminals 142 through 149, the coils 151, 154, 155, and 158 are simultaneously energized, and the coils 152, 153, 156, and 157 remain deenergized. It is evident, therefore, that energization of the coil 151 causes a cancellation of the potential impulse which is induced in each of the substrates 77, 79, 81, and 83 due to energization of the clock coil 159; energization of the coil 154 likewise inhibits any output appearing at the terminals 134, 135, 138, and 139; energization of the coil 155 inhibits any output appearing at the terminals 133, 134, 135, 140, and 141; and energization of the coil 158 inhibits any output appearing at the terminals 140 and 141. Consequently, the terminal 137 is the only output terminal at which there is present a potential impulse which was generated by the clock coil 156, which impulse is, accordingly, indicative of the decimal digit 5.

From the foregoing, it is evident that the following equations logically express each of the decimal output functions in terms of the binary input functions:

$$F_1=1\ \bar{2}\ \bar{4}\ \bar{8}$$
$$F_2=\bar{1}\ 2\ \bar{4}\ \bar{8}$$
$$F_3=1\ 2\ \bar{4}\ \bar{8}$$
$$F_4=\bar{1}\ \bar{2}\ 4\ \bar{8}$$
$$F_5=1\ \bar{2}\ 4\ \bar{8}$$
$$F_6=\bar{1}\ 2\ 4\ \bar{8}$$
$$F_7=1\ 2\ 4\ \bar{8}$$
$$F_8=\bar{1}\ \bar{2}\ \bar{4}\ 8$$
$$F_9=1\ \bar{2}\ \bar{4}\ 8$$

In FIG. 4 is schematically illustrated a further novel concept, whereby two sets of input functions are logically ANDED in a novel manner whereby the flexibility of the logical device is greatly increased. In this particular embodiment, the substrates 159 through 162 have a common electrical conductor 163 threaded therethrough. One end of the conductor 163 is returned to ground potential, whereas its remaining end is connected to output terminal 164.

The mode of operation of this particular embodiment is as follows: A current impulse of half-select magnitude, contra to full-select magnitude as in the previous embodiment, is applied to a select one of the input terminals 165 through 168, and, simultaneously therewith, a half-select current impulse is applied to a selected one of the input terminals 169 through 172. Therefore, if it is assumed that each of the magnetizable areas 173 through 181 possesses a substantially rectangular hysteresis loop characteristic, only the particular area located in the immediate vicinity of a coincidence of the two magnetomotive forces produced by the two half-select current impulses will have its direction of magnetization affected. In other words, a half-select current impulse applied to each of the terminals 165 and 169 causes the remanent saturation of magnetizable area 173 to be reversed, assuming, of course, that its remanent saturation had previously been set in the opposite direction. Likewise, a half-select current impulse applied to each of the terminals 166 and 172 causes the remanent saturation of area 181 to be reversed, and so on.

Thus, the following equation logically expresses output function F in terms of input functions A through D and R through U:

$$F=AR+BR+DR+AS+CS+BT+DT+AU+BU$$

It is therefore evident that output function F is TRUE only when input functions A and R, or B and R, or D and R, or A and S, and so on, are simultaneously rendered TRUE.

In FIGS. 1, 2, and 3 is illustrated a further refinement, in which various additional conductors, illustrated by dotted lines, are threaded through the hollow of each of the substrates and are readily adaptable to be selectively utilized for sensing, driving, or inhibition purposes in a manner well known to those skilled in the art, thereby further adding to the flexibility of the device.

From the foregoing, it is now obvious that there has been devised a novel logical device which is characterized by simplicity of construction and mode of operation, and yet possesses extreme flexibility in being readily adaptable to be utilized in substantially an unlimited number of different types of computer and data processor building blocks. In the fabrication of such novel logical devices, it is necessary simply to selectively deposit or otherwise form a plurality of ferromagnetic ring-like areas onto an elongated substrate at preselected positions along its length and in a manner whereby each area possesses a preferred direction of magnetization which is inclined with respect to the longitudinal axis of the respective substrate, and, thereafter, to provide means for selectively applying a magnetizing force to each of said areas at an angle with respect to the preferred direction of magnetization thereof, and to provide means for detecting a magnetic flux change within each of the magnetizable areas. Alternatively, the entire surface area of the substrate may, if desired, be first provided with a helical flux path magnetic coating in the same manner as shown in United States Letters Patent No. 2,911,317, issued to Dennis Gabor on November 3, 1959, and No. 2,945,217, issued to Robert D. Fisher et al. on July 12, 1960, and, thereafter, the undesired portion of the magnetic coating may be removed in any well known manner, such as by etching, abrasive blasting, grinding, scraping, etc. However, there will next be described a preferred process of fabricating the novel logical devices of the present invention.

In the preferred process, an aqueous electrolytic bath is first prepared having chemical compound concentrations in accordance with either of the plating baths listed below in charts (A) or (B), wherein the concentration of each compound making up each of the baths is given in grams per liter of aqueous solution. Plating bath (A), together with variations in compound and constituent concentrations therein, is more fully discussed in copending United States patent application Serial No. 773,843, of Jerome S. Sallo et al., filed November 14, 1958, and assigned to the present assignee, whereas plating bath (B), together with variations in compound and constituent concentrations therein, is more fully discussed in copending United States patent application Serial No. 764,522, of Ignatius Tsu et al., filed October 1, 1958, and also assigned to the present assignee.

| Plating Bath Compounds | Bath (A) g./l. | Bath (B) g./l. |
|---|---|---|
| Ferric Chloride ($FeCl_3 \cdot 6H_2O$) | 5 | 5 |
| Nickel Chloride ($NiCl_2 \cdot 6H_2O$) | 20 | 20 |
| Sodium Molybdate ($Na_2MoO_4 \cdot 2H_2O$) | ---------- | 1 |
| Ammonium Citrate $(NH_4)_2HC_6H_5O_7$ | 70 | 70 |
| Ammonium Chloride ($NH_4Cl$) | 50 | 50 |

After an electrolytic bath is prepared having compound concentrations in accordance with either of baths (A) or (B), the pH of the bath is adjusted to approximately 8.5 by the addition thereto of a suitable quantity of ammonium hydroxide. Even though the bath may be operated successfully at ordinary room temperature, its temperature is preferably adjusted to approximately 90 degrees centigrade. Thereafter, the bath is introduced into a conventional rubber-lined steel plating tank or into an equivalent inert container.

The substrate, onto which the electrodeposit is to be formed, may be composed of any of a variety of electrically-conductive or non-conductive materials; also, the physical shape or surface configuration of the substrate is not critical and may be tubular, toroidal, planar, rod-shaped, or ribbon-shaped. In fact, the substrate may even be an extremely thin electrically-conductive film which is mechanically supported by an insulating material such as glass, plastic, ceramic, or the like. However, in the illustrative embodiments, it is preferred that the substrates be in the form of hollow Phosphor bronze wires each having an outside diameter of approximately 15 mils and an inner diameter of approximately 8 mils.

The tubular substrate is first provided with a plurality of substantially V-shaped grooves which are helically formed about its periphery by means of any of the well-known methods such as etching, engraving, or the like. It is preferred that the grooves have a depth ranging from approximately 0.1 mil to 1.0 mil, a width of approximately 1 mil or less, a spacing ranging from approximately 0.1 mil to 1.5 mils, and a pitch of approximately 45 degrees. After the grooves have been formed in the surface of the substrate, the substrate is then cleaned in a conventional manner by any of the well-known alkaline-acid-water methods. Due to the fact that it is desirable to secure a relatively thin ferromagnetic deposit on the substrate which has a thickness in the order of one ten-thousandth of an inch so as to maintain eddy current losses therein at a minimum and yet be thick enough to insure adequate "readout" voltages during operation of the logical device, it is necessary that the substrate be exposed as a cathode to electrolytic action in the bath for only a short period of time, preferably in the order of one minute, depending upon the particular value of cathode current density chosen to be used in the plating process. To accomplish this, the process is made a continuous one, whereby the wirelike substrate is moved through the bath at a constant speed by any well-known means, with electrical contacts at all times being maintained with the substrate to supply the plating current thereto. It is also preferred that the substrate be centrally encompassed at all times while in the bath by a helically-shaped anode having a coil diameter of approximately one inch and composed of an electrically-conductive wire of approximately 50 mils in diameter.

The choice of anode material may not be made arbitrarily; however, molybdenum, tungsten, platinum, iron-nickel, and iron-nickel-molybdenum anodes may be used successfully, provided that sludge formations originating at the anode do not enter the bath solution. It is preferred to utilize a platinum anode in conjunction with bath (A). However, a molybdenum anode is preferred to be utilized in conjunction with plating bath (B), as the anode does not necessitate being "bagged" and also tends to replenish the bath with molybdenum ions. Even when a molybdenum anode is used with bath (B), it is generally necessary to continually add molybdate solution to the bath in order to maintain its concentration constant at the desired value. Also, due to the fact that the remaining compound consituents in the bath are depleted during the plating process, it is also generally desirable to continually add solutions of the bath compounds to the plating bath to replenish the ionic content thereof as contributed by each of the compounds.

The current density involved in the deposition process is not critical and may range, for example, from 250 to 1,000 (preferably 500) amperes per square foot of substrate surface area exposed in the bath. The current density primarily determines the rate of deposition of the metallic ions onto the cathode and also affects the rate of diffusion into the cathode film, which influences the amount of depositing species, which must be in equilibrium with the reservoir complexes.

During the just-described plating process, a ferromagnetic coating is peripherally formed on the outermost surface of the substrate substantially conforming to the surface contour thereof, so that a preferred direction of magnetization is established therein which is oriented in substantially the same direction as the grooves. Upon emergence from the plating bath, the thus-coated substrate is rinsed in distilled water and dried. After the drying operation is completed, the undesired portions of the coating are selectively removed by a sandblasting operation in which the substrate is axially rotated, with that portion of the coating to be removed being positioned in the path of a high-speed jet of abrasive material. After the selected portions of the coating are removed, the total number of selectively coated substrates are grouped together in a bundle, and a plurality of coils are wound thereabout at corresponding longitudinally-ordered positions thereof. Thereafter, the logical device is ready for incorporation into the circuitry of the desired computer or data processor.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A logical device comprising: a supporting substrate structure having a surface area which is effectively divided into a coordinately arranged matrix of locations; a plurality of discrete areas of magnetizable material, the total number of which is appreciably less than the total number of said locations, individually disposed on said substrate at different ones of said locations and collectively providing a predetermined pattern of vacant and non-vacant locations throughout the matrix thereof conforming to a predetermined code, each of the magnetizable areas being magnetically separated from the others and having a preferred direction of magnetization; means for selectively applying a magnetizing force to each of said magnetizable areas at an angle with respect to the preferred direction of magnetization thereof; and means for providing an output signal indicative of a magnetic flux change within said magnetizable areas.

2. A logical device comprising: a plurality of tubular substrates, each being effectively divided into a plurality of longitudinally ordered locations; a plurality of discrete areas of magnetizable material, the total number of which is appreciably less than the total number of said locations, circumferentially disposed on said substrates at predetermined ones of said locations and collectively providing a predetermined pattern of vacant and non-vacant locations corresponding to a desired code, each of the magnetizable areas being magnetically separated from the others and having a preferred direction of magnetization; means for selectively applying a magnetizing force to each of said magnetizable areas at an angle with respect to the preferred direction of magnetization thereof; and means for providing an output signal indicative of a magnetic flux change within said magnetizable areas.

3. A logical device comprising: a plurality of elongated electrically conductive substrates, each being effectively divided into a plurality of longitudinally ordered locations; a plurality of magnetic electrodeposits, the total number of which is appreciably less than the total number of said locations, individually surrounding said substrates at predetermined ones of said locations and collectively providing a predetermined pattern of vacant and non-vacant locations corresponding to a desired code, each of said electrodeposits being magnetically separated from the other and having a preferred direction of magnetization; and means for selectively applying a magnetizing force to each said electrodeposits at an angle with respect to the preferred direction of magnetization thereof.

4. A logical device in accordance with claim 3 in which the composition of said magnetic electrodeposits is an alloy or iron and nickel.

5. A logical device comprising: a plurality of elongated substrates individually being effectively divided into a plurality of longitudinally ordered locations and grouped to provide a coordinately arranged matrix of said locations; a plurality of discrete areas of magnetizable material, the total number of which is appreciably less than the total number of said locations, individually surrounding said substrates at predetermined ones of said locations and collectively providing a predetermined pattern of vacant and non-vacant locations throughout the matrix thereof conforming to a desired code, each of the magnetizable areas being magnetically separated from the others and having a preferred direction of magnetization oriented at an angle with respect to one coordinate direction; means for selectively applying a magnetizing force to said magnetizable areas in the said one coordinate direction; and means for providing an output signal indicative of a magnetic flux change within the said magnetizable areas.

6. A logical device comprising: a plurality of elongated substrates individually being effectively divided into a plurality of consecutively-ordered locations with respect to the longitudinal axis thereof and grouped to provide a coordinately arranged matrix of said locations; a plurality of discrete areas of magnetizable material, the total number of which is appreciably less than the total number of said locations, individually surrounding said substrates at predetermined ones of said locations and collectively providing a predetermined pattern of vacant and non-vacant locations throughout the matrix thereof conforming to a desired code, each of the magnetizable areas being magnetically separated from the others and having a preferred direction of magnetization helically oriented with respect to one coordinate direction; means for selectively applying a magnetizing force to said magnetizable areas in said one coordinate direction; and means for providing an output signal indicative of a magnetic flux change within said magnetizable areas.

7. A logical device comprising: a plurality of elongated substrates individually being effectively divided into a plurality of longitudinally ordered locations and grouped to provide a coordinately arranged row and column matrix of said locations; a plurality of discrete areas of magnetizable material, the total number of which is appreciably less than the total number of said locations, individually surrounding said substrates at predetermined ones of said locations and collectively providing a predetermined pattern of vacant and non-vacant locations throughout the matrix thereof conforming to a desired code, each of the magnetizable areas being magnetically separated from the others and having a preferred direction of magnetization oriented at an angle with respect to the longitudinal axis of the respective substrate; means for selectively applying a magnetizing force to said magnetizable areas in the same direction as the longitudinal axis of the respective substrate; and means for providing an output signal indicative of a magnetic flux change within said magnetizable areas.

8. A logical device comprising: a plurality of elongated substrates individually being effectively divided into a plurality of longitudinally ordered locations and grouped to provide a coordinately arranged row and column matrix of said locations; a plurality of discrete areas of magnetizable material, the total number of which is appreciably less than the total number of said locations, individually surrounding said substrates at predetermined ones of said locations and collectively providing a predetermined pattern of vacant and non-vacant locations throughout the matrix thereof conforming to a desired code, each of the magnetizable areas being magnetically separated from the others and having a preferred direction of magnetization oriented at an angle with respect to the coordinate direction of the column within which the particular magnetizable area is located; means for selectively applying a magnetizing force to said magnetizable areas in the same direction as said coordinate direction; and means for providing an output signal indicative of a magnetic flux change within said magnetizable areas.

9. A logical device in accordance with claim 2 wherein said detecting means comprises: a conductor threaded through the hollow of each of said substrates.

10. A logical device comprising: a plurality of electrically conductive and tubular substrates individually being effectively divided into a plurality of longitudinally ordered locations and grouped to provide a coordinately arranged row and column matrix of said locations; a plurality of discrete areas of magnetic iron-nickel alloy electrodeposits, the total number of which is appreciably less than the total number of said locations, individually circumferentially disposed on said substrates at predetermined ones of said locations and collectively providing a predetermined pattern of vacant and non-vacant locations throughout the matrix thereof conforming to a desired code, each of said electrodeposits being magnetically separated from the others and having a preferred direction of magnetization helically oriented with respect to the longitudinal axis of the respective substrate; and a plurality of similar, equally-spaced and electrically energizable coils encircling said substrates, each of said coils being inductively coupled to all of the electrodeposits located in a different one of the columns of said matrix.

11. A logical device comprising: a plurality of elongated substrates, each being effectively divided into a plurality of longitudinally ordered locations; a plurality of groups of discrete areas of magnetizable material, the total number of said areas of magnetizable material being appreciably less than the total number of said locations and each area being magnetically separated from the others and having a preferred direction of magnetization, the magnetizable areas of each group surrounding said substrates at predetermined ones of said locations and each group of magnetizable areas collectively providing a different predetermined pattern of vacant and non-vacant locations corresponding to a different desired code; means for selectively applying a magnetizing force only to the magnetizable areas of a selected group and at an angle with respect to the preferred direction of magnetization of the respective magnetizable area of said selected group; and means for providing an output signal indicative of a magnetic flux change within the magnetizable areas of said selected group.

12. A logical device comprising: a plurality of elongated substrates, each being effectively divided into a plurality of consecutively ordered locations with respect to the longitudinal axis thereof; a first and a second plurality of discrete areas of magnetizable material, the total number of said areas of magnetizable material being appreciably less than the total number of said locations, the magnetizable areas of said first plurality surrounding said substrates at predetermined odd ordered ones of said locations and collectively providing a first predetermined pattern of vacant and non-vacant locations corresponding to a first desired code, the magnetizable areas of said second plurality surrounding said substrates at predetermined even ordered ones of said locations and collectively providing a different predetermined pattern of vacant and non-vacant locations corresponding to a different desired code, and each of said magnetizable areas being magnetically separated from the others and having a preferred direction of magnetization; means for selectively applying a magnetizing force only to the magnetizable areas of a selected plurality and at an angle with respect to the preferred direction of magnetization of the respective magnetizable area of said selected plurality; and means for providing an output signal indicative of a magnetic flux change within the magnetizable areas of said selected plurality.

13. A logical device comprising: a plurality of elongated substrates individually being effectively divided into a plurality of longitudinally ordered locations and grouped to provide a coordinately arranged row and column matrix of said locations; a plurality of groups of discrete areas of magnetizable material, the total number of said areas of magnetizable material being appreciably less than the total number of said locations, the magnetizable areas of each group surrounding said substrates at predetermined locations, and each group of magnetizable areas collectively providing a different predetermined pattern of vacant and non-vacant locations corresponding to a different desired code, and each of said magnetizable areas being magnetically separated from the others and having a preferred direction of magnetization oriented at an angle with respect to the longitudinal axis of the respective substrate; a plurality of coils encircling said substrates and adapted to be manually positioned in unison into inductively coupled relationship with respect to a selected one of said groups of magnetizable areas; and means for providing an output signal indicative of a magnetic flux change within each of said magnetizable areas of said selected group.

14. A logical device comprising: a plurality of elongated substrates individually being effectively divided into a plurality of consecutively ordered locations with respect to the longitudinal axis thereof and grouped to provide a coordinately arranged row and column matrix of said locations; a plurality of groups of discrete areas of magnetizable material, the total number of said areas of magnetizable material being appreciably less than the total number of said locations and each of said areas being magnetically separated from the others and having a preferred direction of magnetization oriented at an angle with respect to the longitudinal axis of the respective substrate, the magnetizable areas of each group surrounding said substrates at predetermined ones of the locations within a different set of progressively higher order columns, said predetermined locations of each set being determined in accordance with a different desired code, and the particular columns within each columnar set being determined by arithmetic progression; a plurality of substantially equally spaced coils encircling said substrates and adapted to be manually positioned in unison into inductively coupled relationship with respect to the magnetizable areas of a selected one of said groups and energizable to provide a magnetizing force oriented along the axis of said substrates; and means for providing an output signal indicative of a magnetic flux change within each of said magnetizable areas of said selected group.

15. A logical device comprising: a plurality of electrically conductive and tubular substrates individually being effectively divided into a plurality of consecutively ordered locations with respect to the longitudinal axis thereof and grouped to provide a coordinately arranged row and column matrix of said locations; a first and a second plurality of discrete areas of magnetic iron-nickel alloy electrodeposits, the total number of said electrodeposits being appreciably less than the total number of said locations and the electrodeposits of said first plurality being circumferentially disposed on said substrates at predetermined odd-ordered locations in accordance with a first desired code, the electrodeposits of said second plurality being circumferentially disposed on said substrates at predetermined even-ordered locations in accordance with a different desired code, and each of said electrodeposits being magnetically separated from the others and having a preferred direction of magnetization helically oriented with respect to the longitudinal axis of the respective substrate; and a plurality of equally-spaced coils encircling said substrates and adapted to be manually positioned in unison into inductively coupled relationship with respect to the electrodeposits of a selected one of said first and second pluralities and energizable to provide a magnetizing force oriented along the axis of said substrates.

References Cited by the Examiner

UNITED STATES PATENTS

| | | | |
|---|---|---|---|
| 2,768,367 | 10/1956 | Rajchman | 340—166 |
| 2,792,563 | 5/1957 | Rajchman | 340—174 |
| 2,920,317 | 1/1960 | Mallery | 340—174 X |
| 2,988,733 | 6/1961 | Mallery | 340—174 |
| 2,999,639 | 9/1961 | Lipkin | 307—88 X |
| 3,027,548 | 3/1962 | Vaughn. | |
| 3,031,648 | 4/1962 | Haber et al. | 340—17 |

FOREIGN PATENTS

| | | |
|---|---|---|
| 1,190,683 | 4/1959 | France. |
| 845,604 | 8/1960 | Great Britain. |

BERNARD KONICK, *Primary Examiner.*

IRVING SRAGOW, *Examiner.*

F. C. WEISS, *Assistant Examiner.*